G. E. McLAUGHLIN.
PIPE COUPLING.
APPLICATION FILED MAY 23, 1907.

932,805.

Patented Aug. 31, 1909.

Inventor
George E. McLaughlin

Witnesses

By Victor J. Evans
Attorney

UNITED STATES PATENT OFFICE.

GEORGE E. McLAUGHLIN, OF HUNTINGTON, WEST VIRGINIA.

PIPE-COUPLING.

932,805.

Specification of Letters Patent. Patented Aug. 31, 1909.

Application filed May 23, 1907. Serial No. 375,286.

*To all whom it may concern:*

Be it known that I, GEORGE E. McLAUGHLIN, a citizen of the United States of America, residing at Huntington, in the county of Cabell and State of West Virginia, have invented new and useful Improvements in Pipe-Couplings, of which the following is a specification.

This invention relates to pipe couplings, and one of the principal objects of the same is to provide a coupling which can be quickly and easily renewed when any of the parts become worn or injured without disturbing the pipe sections.

Another object of the invention is to provide a pipe coupling in which one of the parts is made in section so that it can be readily removed for repairs or renewals.

Figure 1:
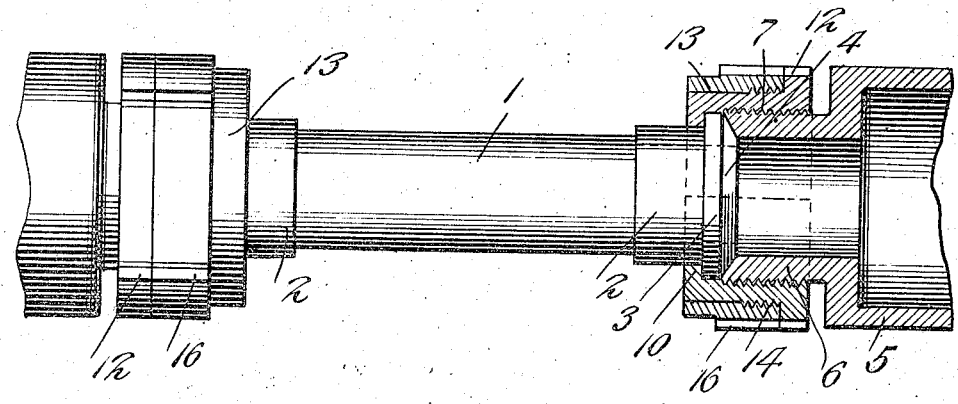
Figure 2:
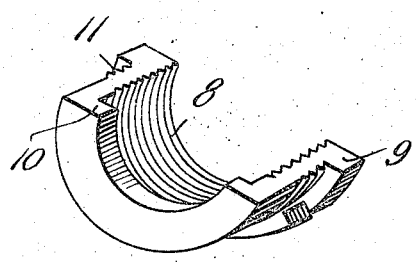
Figure 3:
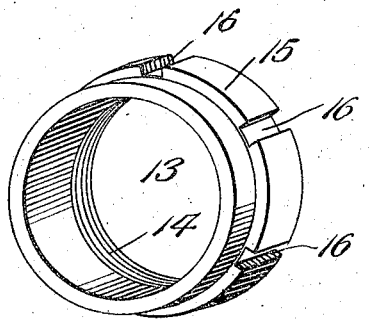

These and other objects may be attained by means of the construction illustrated in the accompanying drawing, in which:

Figure 1 is a front elevation of a pipe section, and showing one of my pipe couplings in section and the others in elevation. Fig. 2 is a detail perspective view showing one section of the inner member of my pipe coupling. Fig. 3 is a perspective view of the outer member of my pipe section.

Referring to the drawing for a more particular description of my invention, the numeral 1 designates a connecting pipe section provided upon its ends with a sleeve 2 provided with a flange 3 beveled upon its outer surface, as at 4, to fit the inwardly beveled portion of the pipe section. The pipe section is provided with a reduced portion 6, having screw threads 7 formed thereon, and fitted to the threads 7 is a sectional member preferably composed of two sections, each provided with interior screw threads 8, an outwardly extending flange 9, and an inwardly extending flange 10 at the outer end thereof, said sections each having exterior screw threads 11, and spanner grooves 12. The flange 10 engages the outer surface of the flange 4 of the sleeve 2, while the threads 8 engage the threads 7 on the reduced portion 6 of the pipe section. Fitted over the sectional members is a collar 13 having internal screw threads 14 to fit the threads 11 of the two sections of the coupling, said collar having an outwardly extending flange 15 provided with spanner grooves 16.

With a pipe coupling made in accordance with my invention, whenever it becomes necessary to renew any of the parts, the collar 13 is removed by a spanner engaging the grooves 16. When the collar 13 is removed from the sectional members, the latter may be withdrawn from the reduced portion 6 for repairs or renewals when the collar may be screwed tightly in place, without the necessity of disturbing the pipe connection 1.

From the foregoing it will be obvious that a pipe coupling made in accordance with my invention is of simple construction, can be quickly attached to and detached from the pipe sections, and will permit of repairs and renewals without disturbing the pipe connection.

Having thus described the invention, what I claim is:

The herein described pipe coupling comprising a coupling section provided at each of its ends with an integral sleeve forming an enlarged portion each having a beveled flange at its outer end, pipe sections, each provided with a reduced and beveled outer end to fit the beveled end of the sleeve, said reduced ends each having an exterior threaded portion, sectional coupling members each provided with interior screw threads to engage the exterior threaded portion of the pipe section and each having an outwardly extending flange at one end and an inwardly extending flange at the opposite end thereof, said last mentioned flange engaging the beveled flange of the coupling section, said coupling members having exterior screw threads adjacent to the outwardly extending flange, and a collar provided with interior screw threads at one end to fit the exterior threads of said coupling members, said collar having an outwardly projecting flange provided with spanner grooves.

In testimony whereof, I affix my signature in presence of two witnesses.

GEORGE E. McLAUGHLIN.

Witnesses:
 FRED L. SUMMERS,
 CHAS. F. REUSHLEIN.